June 24, 1941.   L. C. BOWMAN   2,246,834

LOCKING HITCH BOLT

Filed April 8, 1940

LOWELL C. BOWMAN
INVENTOR.

BY Samuel S. Jacobson
ATTORNEY.

Patented June 24, 1941

2,246,834

UNITED STATES PATENT OFFICE 2,246,834

LOCKING HITCH BOLT

Lowell C. Bowman, Hillsboro, Oreg.

Application April 8, 1940, Serial No. 328,421

1 Claim. (Cl. 85—3)

This invention relates to bolts in general and specifically to bolts used in retaining two or more elements in disengageable engagement with each other without the use of a nut and/or cotter key.

The primary object of this invention is to provide a threadless bolt which may be used to join two members together, such as a clevis and tongue, and which possesses movable means for holding the bolt in place.

Another object of the invention is to provide a bolt which has a movable bolt-retaining member and a resilient member formed as a part thereof.

Still another object of the invention is to provide a bolt which may be used in connecting to a vehicle any apparatus which may be drawn by the vehicle, such as trailers and farm implements.

An equally important object of the invention is to provide a bolt which may be used to connect two or more objects which require some movement between them and which may require separation with a minimum of effort and loss of time.

Still another object of the invention is to provide a threadless bolt which does not require a nut and/or cotter key to secure the bolt against accidental removal from the members which it joins together.

As a corollary to the above object, the invention contemplates the use of means for insuring against the accidental removal of the bolt from its working position but also permits rapid installation or deliberate removal of the bolt with dispatch and without the employment of any tools whatever.

Among other objects of the invention is that of providing a bolt which is simple but durable in construction, reliable and handy to use, inexpensive to manufacture, unobtrusive when in place, decorative and attractive in its external appearance and which may be made into various sizes to accommodate different requirements.

Other objects and advantages will undoubtedly come to mind from the following description which must be read in conjunction with the accompanying drawing which illustrates one preferred and one modified embodiment by which the invention may be realized and in which.

All parts having the same structural characteristics will be given the same reference character throughout the several views of the drawing.

Figure 1:
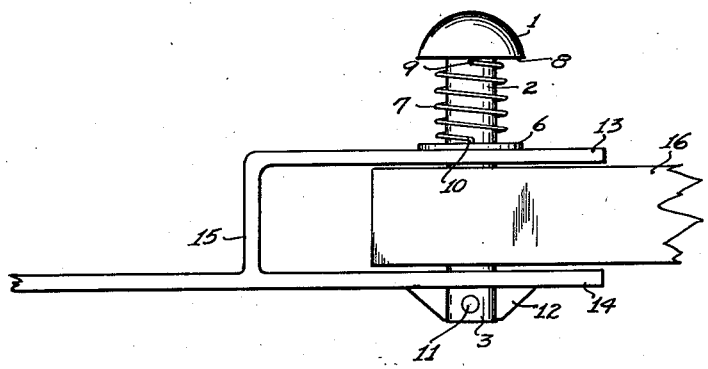
Figure 1 is an elevation of a bolt embodying the principles of my invention, showing its position in relation to a clevis and tongue arrangement after it has joined the two together and is held securely by the bolt-retaining member.

The bolt embodying the principles of my invention consists of a head 1, possessing contours common to bolts of present manufacture, and a stem 2, the length and diameter of which are determined by the job the bolt embodying the principles of my invention is intended to perform. The lower portion of the stem 2 is bifurcated to form fingers 3 and 4 and groove 5. A washer 6 is disposed around the stem 2 and is fitted therearound so that the stem may move freely therein. A helical spring 7 surrounds the stem 2 and is disposed between the top of the washer 6 and the underside 8 of the head 1. While it is not essential for the effective operation of the bolt that the helical spring 7 be fastened relative to the washer and the stem, it is deemed desirable that it be secured in order to avoid loss of not only the spring, but also the washer. This is accomplished by inserting the end 9 of the spring 7 into an opening provided in the stem and the end 10 into an opening provided in the washer 6. In this manner the spring and the washer are secured against removal from the stem 2.

A pin 11 is inserted into fingers 3 and 4 of stem 2 and a bolt-retaining member 12 is secured to pin 11 and confined between fingers 3 and 4 in groove 5. The thickness of bolt-retaining member 12 is approximately equal to the thickness of the groove 5, so that it fits snugly therein and requires the application of some force to move it about pin 11. The bolt-retaining member may possess any desired shape although the trapezoidal shape shown in the drawing is deemed most desirable from the standpoint of appearance and function, since it aids in inserting the bolt into the openings of the elements to be joined by the bolt embodying my invention.

Figure 2:
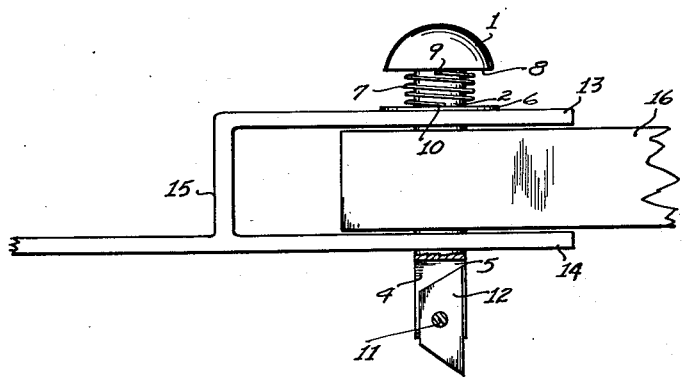
Figure 2 is an elevation of the bolt embodying the principles of my invention, partly in section and partly broken away, to show its position in relation to a clevis and tongue arrangement either after it is inserted or prior to its removal therefrom.

When it is desired to use a bolt embodying the structural characteristics heretofore related for hitching together two vehicles, such as an automobile and a trailer, the stem 2 of the bolt embodying the principles of my invention is inserted in the aligned openings provided in the top and bottom plates 13 and 14 of clevis 15, after the opening formed in the tongue 16 is positioned into registerable alignment with the openings formed in the plates of the clevis 15. The position of the bolt-retaining member 12, when the bolt has been inserted into the openings formed in the clevis and the tongue, is best illustrated in Figure 2 which shows the retaining member 12 in longitudinal alignment with the stem 2, so that the stem may easily be inserted into the openings. In order to permit the retaining member 12 to be placed in the position shown in Figures 1 and 3, it is necessary to press downwardly on the head 1 of the bolt, so that the helical spring 7 is depressed as shown in Figure 2. When the bolt is in this position, the retaining member 12 is cleared from any obstruction to its movement in the groove 5 and it is easy to place the retaining member 12 in transverse position relative to the stem 2 of the bolt, so that it assumes the position shown in Figures 1 and 3. The pressure applied on the head 1 is then released and the compression on the helical spring 7 forces the bolt to assume the position shown in Figure 1. The helical spring 7 remains at all times under some compression, thereby holding the retaining member tautly against the plate 14 and also thus avoiding objectionable noises incident to any loose connection. When it is desired to remove the bolt from its position relative to the clevis 15 and the tongue 16, the head 1 is pressed downwardly to depress spring 7 into the position shown in Figure 2 and the retaining member then is placed into longitudinal alignment with stem 2. The pressure on the spring is then removed from the head 1 and the bolt is withdrawn from the openings in the clevis and tongue, thus disengaging the two.

Figure 3:
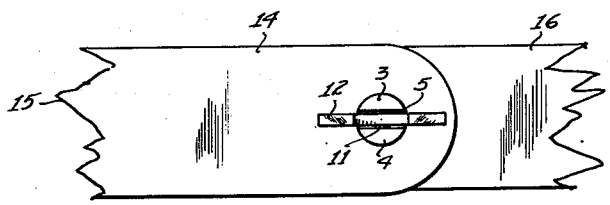
Figure 3 is a fragmentary worm's-eye view of the bolt embodying the principles of my invention, showing the position of the bolt-retaining member, when the bolt is in locked position.
Figures 4, 5:
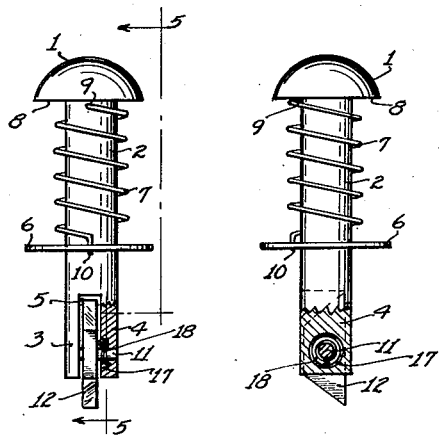
Figure 4 is an elevation, partly in section, of a slightly modified bolt embodying the principles of my invention.
Figure 5 is an elevation, partly in section, of the slightly modified bolt shown in Figure 4, taken on line 5—5 of said figure, looking in the direction indicated.

The slightly modified construction employed in Figures 4 and 5 consists of a recess 17 formed in one of the fingers, such as finger 4. A helical spring 18 surrounds the pin 11 and has one of its ends anchored to the retaining member 12 and the other of itse ends anchored in the finger 4. When this type of construction is employed, the thickness of the retaining member may be less than that of the groove 5. The helical spring 18 maintains the retaining member 12 at all times in longitudinal alignment with the stem 2 as shown in Figures 4 and 5. When it is desired that the retaining member 12 shown in Figures 4 and 5 assume the position of the retaining member 12 as shown in Figures 1 and 3, helical spring 7 is depressed to the position as shown in Figure 2 and the retaining member 12 is transversely aligned in relation to stem 2 against the resistance of the spring 18. The pressure is then removed from the helical spring 7 while the retaining member 12 is held in its transverse position until it contacts the plate 14 of the clevis 15. The retaining member 12 will then be held in this position by the constant upward urge of the spring 7 on the stem 2, thus overcoming the resistance of the spring 18 to normally urge the retaining member 12 to assume the positions shown in Figures 4 and 5.

The clevis and tongue shown in the drawing are merely for illustrative purposes in order to indicate one means by which the invention may be employed in joining two or more elements together, when it is desired that such elements be easily disengageable. It is therefore to be understood that it is not to be considered as a limitation to the uses to which the invention may be put; and, while the invention has been described in connection with one preferred and one modified embodiment, it should be understood that variants thereof are possible to those skilled in the art. The invention, therefore, in its broader aspect is not limited to the specific construction herein shown and described since changes may be made in the structural characteristics without departing from the spirit of the invention. Hence it is to be understood that I do not limit myself to the precise construction set forth and desire, therefore, that only such limitations shall be placed thereupon as are embodied by and specifically set forth in the claim.

Having thus described my invention, what I claim as new and desire to secure by Letters Patent is:

In a device of the class described, comprising a threadless bolt of well-known contours, the lower portion of said bolt being bifurcated to form a groove in the stem thereof, a pin fixedly secured in transverse relation to and confined to the bifurcated portion of said stem, a trapezoidally-shaped bolt-retaining member movably disposed upon said pin and confined within said groove adapted to lock said bolt in place when desired, said bolt retaining member, when in transverse relation to the bolt, forming projections beyond the circumference of the bolt, a washer surrounding the stem of said bolt, a spring circumscribing the stem of said bolt and disposed between the head of said bolt and said washer adapted to be normally compressed, when said bolt is in locked position and a resilient element associated with said pin and said bolt retaining member adapted normally to urge and maintain the bolt retaining member in said groove and in vertical alignment with said stem.

LOWELL C. BOWMAN.